(12) United States Patent
Kawamoto et al.

(10) Patent No.: US 6,623,071 B2
(45) Date of Patent: Sep. 23, 2003

(54) SEAT FITTING STRUCTURE FOR MOTOR SCOOTER TYPE VEHICLE

(75) Inventors: Shuichi Kawamoto, Saitama (JP); Sadamichi Enjyo, Saitama (JP); Seiichi Tateishi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 53 days.

(21) Appl. No.: 09/793,430

(22) Filed: Feb. 27, 2001

(65) Prior Publication Data

US 2001/0022462 A1 Sep. 20, 2001

(30) Foreign Application Priority Data

Feb. 29, 2000 (JP) ........................................ 2000-052922

(51) Int. Cl.[7] .................................................. B62J 1/14
(52) U.S. Cl. ....................... 297/195.13; 70/256; 70/261; 297/188.09; 297/243; 297/440.22
(58) Field of Search ..................... 297/195.12, 195.13, 297/188.09, 188.1, 243, 440.22; 70/261, 256; 292/125, 225; 180/219

(56) References Cited

U.S. PATENT DOCUMENTS

| | | | | |
|---|---|---|---|---|
| 3,779,597 A | * | 12/1973 | Uchida | 296/37 |
| 3,927,727 A | * | 12/1975 | Hanagan | 180/219 X |
| 4,456,289 A | * | 6/1984 | Badiali | 292/125 X |
| 4,907,428 A | * | 3/1990 | Nakashima et al. | 180/219 X |
| 5,040,632 A | * | 8/1991 | Fuji et al. | 180/219 |
| 5,533,783 A | * | 7/1996 | Harms et al. | 297/195.13 |
| 5,535,608 A | * | 7/1996 | Brin | 70/256 |
| 6,354,476 B1 | * | 3/2002 | Alderman | 224/413 |

FOREIGN PATENT DOCUMENTS

JP          A10203443          8/1998

* cited by examiner

Primary Examiner—Peter M. Cuomo
Assistant Examiner—Stephen Vu
(74) Attorney, Agent, or Firm—Birch, Stewart, Kolasch & Birch, LLP

(57) ABSTRACT

A locking claw of a first seat locking mechanism is connected to a locking claw of a second seat locking mechanism by a second wire through a relay member so that, when the first seat locking mechanism is locked by an external force such as pressing down a seat by hand, the second seat locking mechanism is locked in conjunction with the first seat locking mechanism. The locking operations for a plurality of the first and second seat locking mechanisms can be carried out collectively and easily. In addition, locking of the plurality of lock members can be carried out assuredly without being influenced by dimensional variations, variations in assembly of a first and second U-shaped fixtures and the first and second seat locking mechanisms, by stiffness of the seat or the like. Therefore, repeated closing of the seat as in the case of the prior art where either one of a plurality of lock members fails to lock can be obviated, and convenience to use of the seat can be enhanced.

13 Claims, 8 Drawing Sheets

SEAT FITTING STRUCTURE FOR MOTOR SCOOTER TYPE VEHICLE

BACKGROUND OF THE INVENTION

1. Field of the Invention

The present invention relates to a seat fitting structure for motor scooter type vehicle that is suited for enhancing the user with convenience.

2. Description of the Background Art

Motor scooter type vehicles adopt a structure in which a sea is openable so that a helmet or the like can be stored in a storage portion beneath the seat. Known structures for fitting such a seat include, for example, are disclosed in Japanese Patent Laid-open No. Hei 10-203443, entitled "Seat Fitting Structure for Motor Scooter Type Vehicle". In FIG. 2 of the above-mentioned publication, there is described a technology of a seat fitting structure in which a first U-shaped fixture 58 and a second U-shaped fixture 59 are attached to a lower portion of an openable seat 16 provided as a combined driver's and passenger's seat, the first U-shaped fixture 58 is engaged with a first seat locking mechanism 100 mounted on the vehicle body side, and the second U-shaped fixture 59 is engaged with a second seat locking mechanism 120.

Motor scooter type vehicles adopt a structure in which a seat is openable so that a helmet or the like can be stored in a storage portion beneath the seat. Known structures for fitting such a seat include, for example, that disclosed in Japanese Patent Laid-open No. Hei 10-203443 entitled "Seat Fitting Structure for Motor Scooter Type Vehicle". In FIG. 2 of the above-mentioned publication, there is described a technology of a seat fitting structure in which a first U-shaped fixture 58 and a second U-shaped fixture 59 are attached to a lower portion of an openable seat 16 provided as a combined driver's and passenger's seat, the first U-shaped fixture 58 is engaged with a first seat locking mechanism 100 mounted on the vehicle body side, and the second U-shaped fixture 59 is engaged with a second seat locking mechanism 120.

In addition, it is described that, as shown in FIG. 11 of the above-mentioned publication, the first seat locking mechanism 100 is provided with a locking claw 104 and a relay arm 108 which is pressed against the locking claw 104 to keep the locking claw 104 in a locking condition. Also, it is described that, as shown in FIG. 13 of the publication, the second seat locking mechanism 120 is provided with a locking claw 124, and the relay arm 108 and the locking claw 124 are connected with each other through a second wire 136.

According to the above-mentioned technology, the seat 16 is large in size and there is a problem that, when the seat 16 is closed, either engagement between the first U-shaped fixture 58 and the first seat locking mechanism 100 or engagement between the second U-shaped fixture 59 (located away from the first U-shaped fixture 58) and the second seat locking mechanism 120 may not be achieved assuredly due to influences of dimensional precision and precision of assembly onto the vehicle body side of the first and second U-shaped fixtures 58, 59 and the first and second seat locking mechanisms 100, 120, or stiffness of the seat 16.

In this case, in order to attain perfect engagement at the two locations, the user must individually press down those portions of the seat 16 corresponding to the first and second U-shaped fixtures 58, 59, or must re-open the seat 16 and re-close it. Thus, the structure is inconvenient to use.

SUMMARY AND OBJECTS OF THE INVENTION

Accordingly, it is an object of the present invention to provide a seat fitting structure for motor scooter type vehicle by which convenience to use can be enhanced.

According to the present invention, the above object can be accomplished by a motor scooter type vehicle comprising a storage portion for storing a helmet or the like, an openable seat closing an opening of the storage portion, a plurality of seat hooks attached to a lower surface of the seat, and a main lock mechanism and at least one auxiliary lock mechanism provided on the vehicle body side to be engaged respectively with the seat hooks so that the seat can be locked by a plurality of lock members, a locking member of the main lock mechanism is connected to a locking member of the auxiliary lock mechanism through a connecting member such as a wire so that, when the main lock mechanism is locked by an external force, the auxiliary lock mechanism is locked in conjunction with the main lock mechanism.

According to a certain aspect of the present invention, the connecting member ensures that, when the main lock mechanism is locked under an external force, at least one auxiliary lock mechanism is locked in conjunction with the main lock mechanism. Thus, the locking operations for the plurality of main and auxiliary lock mechanisms are carried out collectively and easily. In addition, locking operations of a plurality of lock members is conducted assuredly without being influenced by variations in size, variations in assembly of the seat hooks, the main lock mechanism and at least one auxiliary mechanism, by stiffness of the seat, or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
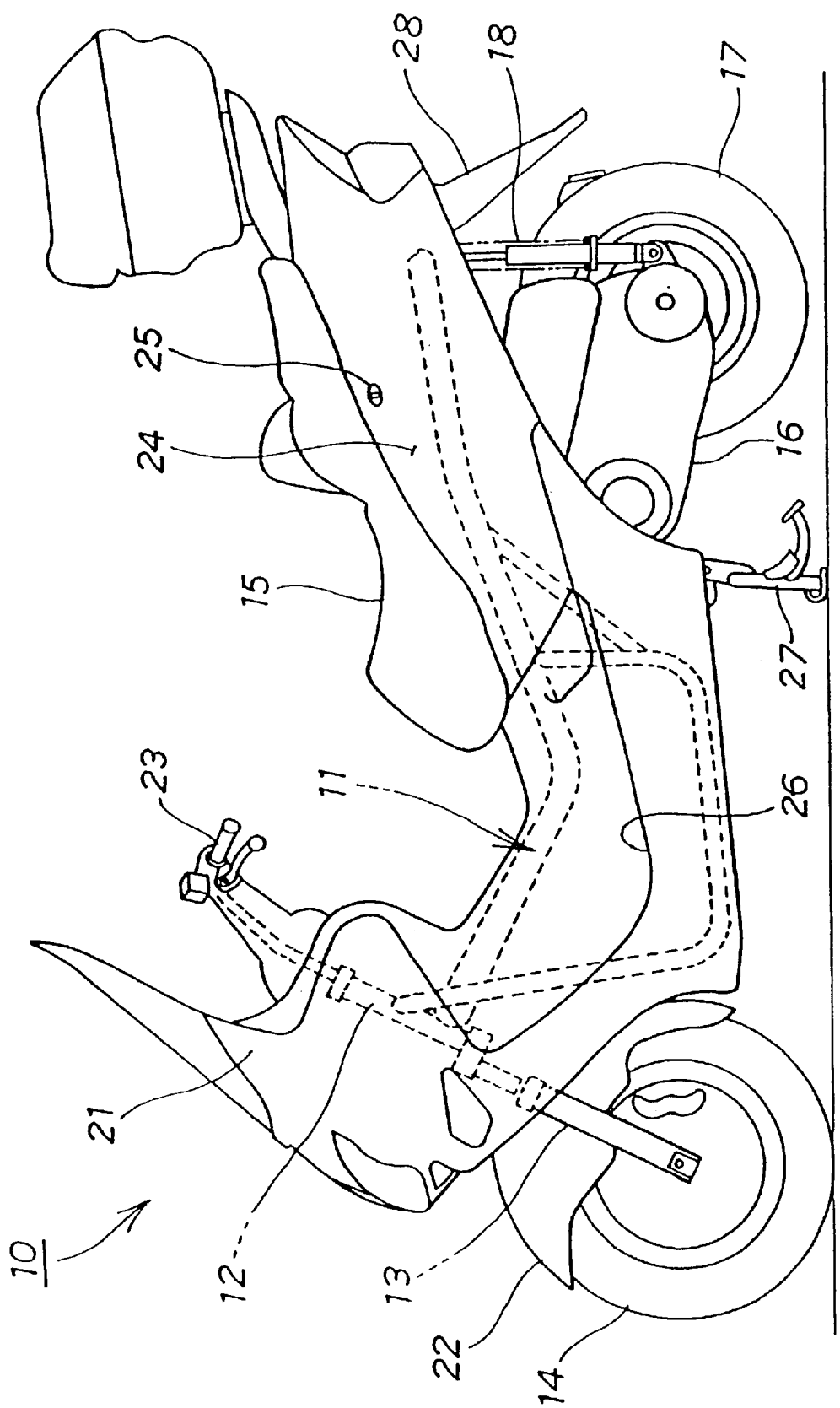
FIG. 1 is a side view of a motor scooter type vehicle to which the seat fitting structure according to the invention has been applied.

In the following, the present invention is described with reference to the accompanying drawings. FIG. 1 is a side view of a motor scooter type vehicle to which a seat fitting structure according to the invention has been applied. The motor scooter type vehicle (hereinafter referred to as "vehicle") 10 comprises a vehicle body frame 11, a front fork 13 and a front wheel 14 steerably fitted to a head pipe 12 at a front portion of the vehicle body frame 11, an openable seat 15 covering an upper portion of a luggage box (not shown) fitted to a rear portion of the vehicle body frame 11, a power unit 16 disposed below the seat 15, a rear wheel 17 fitted to a rear portion of the power unit 16, and a rear cushion unit 18 bridgingly fitted between the rear end of the power unit 16 and the rear end of the vehicle body frame 11.

In addition, the vehicle includes a front cover 21, a front fender 22, a handle 23, a body cover 24, a seat locking key cylinder 25 for opening the seat 15, a floor step 26, a stand 27, and a rear fender 28.

Figure 2:
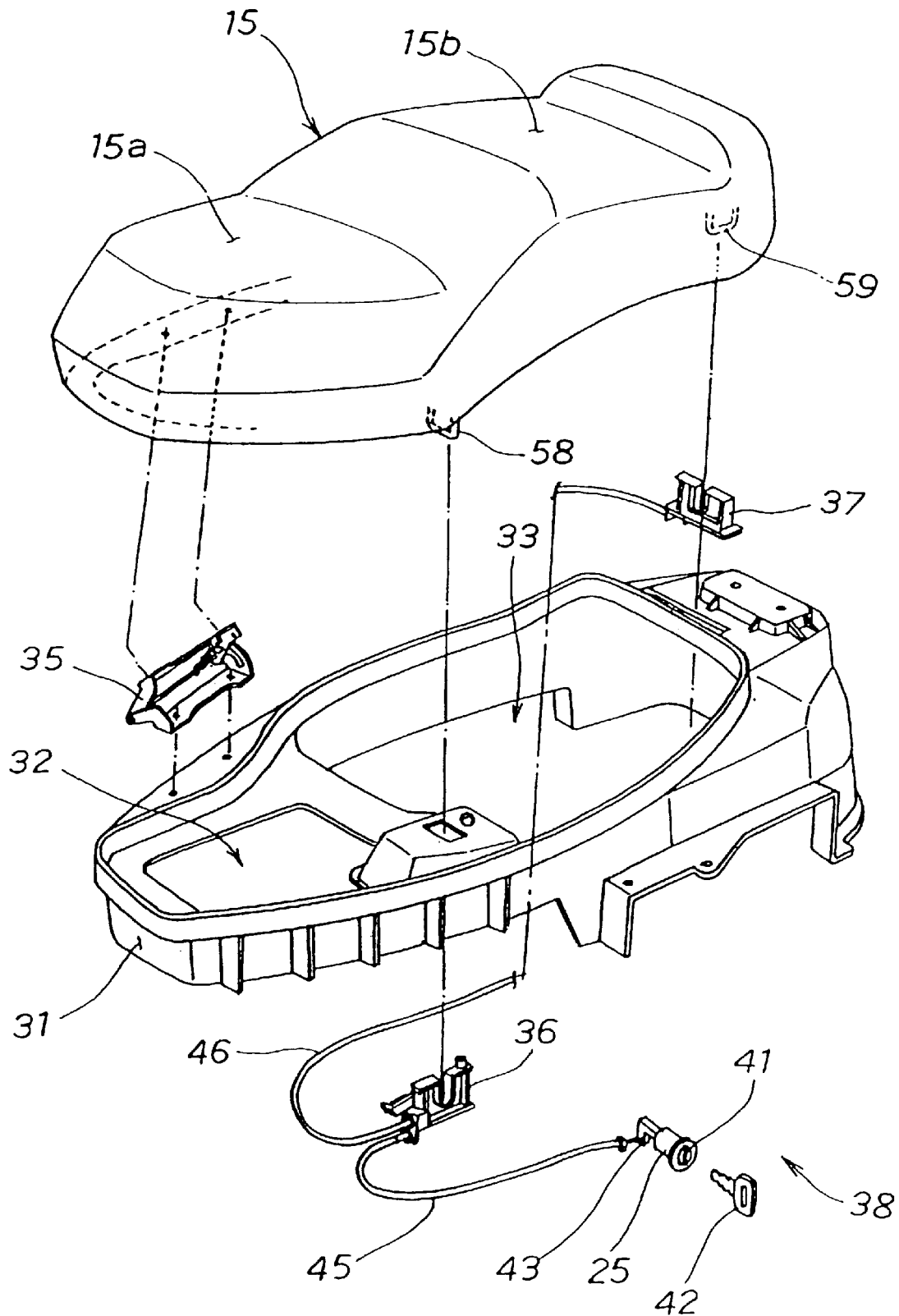
FIG. 2 is a perspective view showing a seat, a luggage box and locking mechanisms of a motor scooter type vehicle according to the invention.

FIG. 2 is a perspective view showing the seat 15, the luggage box 31 and the unlocking mechanism 38 of the motor scooter type vehicle according to the invention. The seat 15 is an elongate large seat called double seat, which comprises a front seat surface 15a for the driver and a rear seat surface 15b for a passenger (co-rider) in a front-rear relationship.

As shown in FIG. 2, luggage box 31 illustrates a storage portion, of which a lower portion (not shown) is laid on the lower side to form a front storage portion 32 and a rear storage portion 33. Furthermore, FIG. 2 illustrates a seat hinge 35, a first seat locking mechanism 36 as a main lock mechanism, a second seat locking mechanism 37 as an auxiliary lock mechanism, and an unlocking mechanism 38. Structures of the seat hinge 35 and the first and second seat locking mechanisms 36, 37 will be described later.

The unlocking mechanism 38 comprises the above-mentioned seat unlocking key cylinder 25 holding a lever 43 enabling a key 42 to be inserted into a keyhole 41 and be rotated, a first wire 45 as a connecting member for connection between the lever 43 and the first seat locking mechanism 36, and a second wire 46 as a connecting member for connection between the first seat locking mechanism 36 and the second seat locking mechanism 37.

Figure 3:
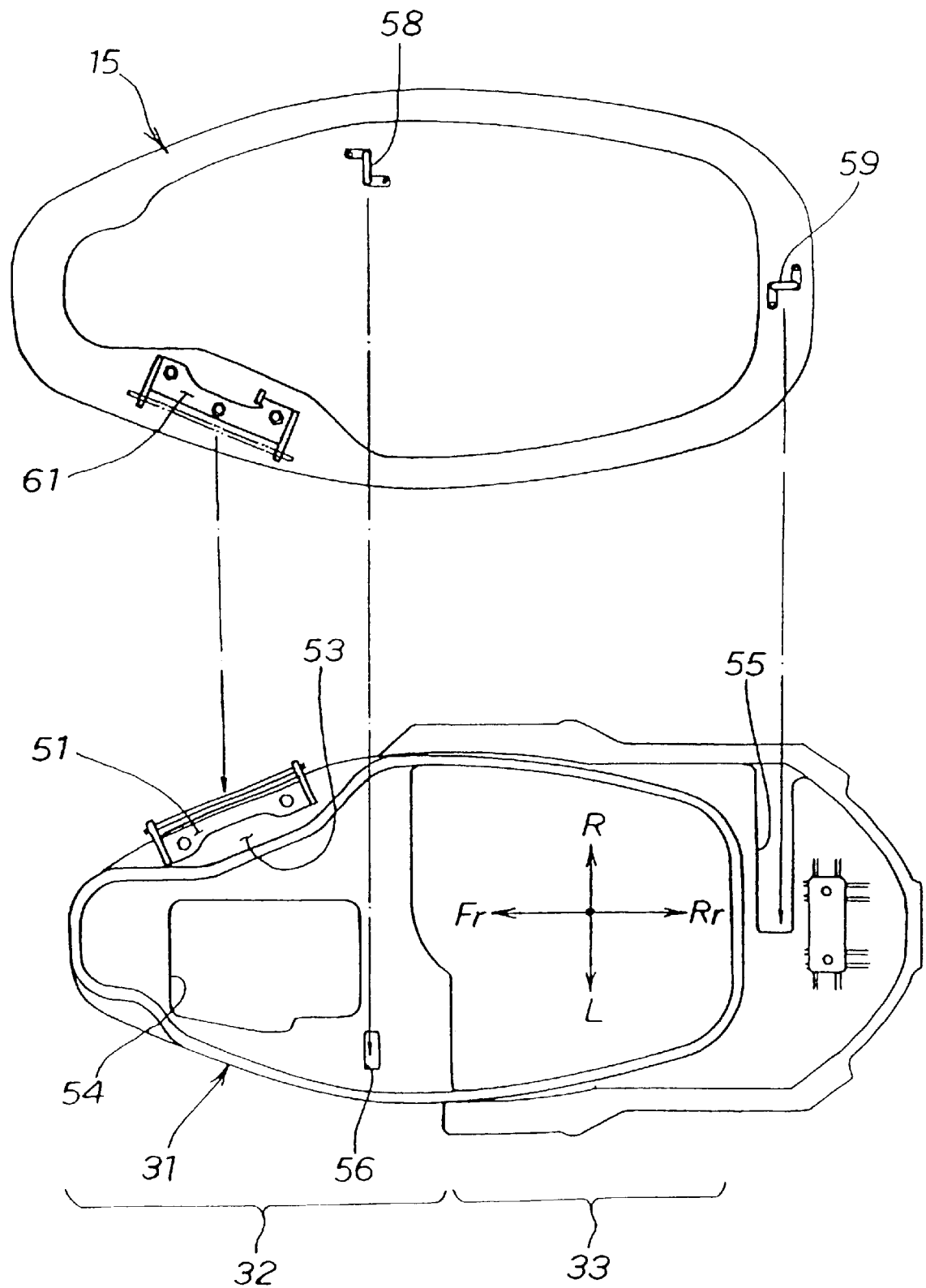
FIG. 3 is a bottom plan view of a seat and a plan view of a luggage box according to the invention.

FIG. 3 shows a bottom plan view of a seat and a plan view of a luggage box, according to the invention. The luggage box 31 is a member for forming the front storage portion 32 and the rear storage portion 33 as described above. The luggage box 31 comprises a sponson portion 53 for mounting a lower hinge plate 51 at the front right corner (a right side portion of a front portion; the directions shown in the figure, i.e. Fr for front, Rr for rear, L for left, R for right and the like, are based on the driver), an engine inspection window 54 (normally closed with a lid, not shown), a recessed groove 55 for containing the second wire 46, as shown in FIG. 2 at a rear portion, and a small opening 56 on the left side of a central portion. The front storage portion 32 is shallow, while the rear storage portion 33 is deep and large.

The seat 15 is provided on its bottom side with a first U-shaped fixture 58 as a seat hook, a second U-shaped fixture 59 as a seat hook, and an upper hinge plate 61 which forms a seat hinge 35 together with a lower hinge plate 51.

The first U-shaped fixture 58 extends in the width direction of the vehicle, while the second U-shaped fixture 59 extends in the longitudinal direction of the vehicle (front-rear direction of the vehicle); thus, the extending directions of the U-shaped fixtures are orthogonal to each other.

Figure 4:
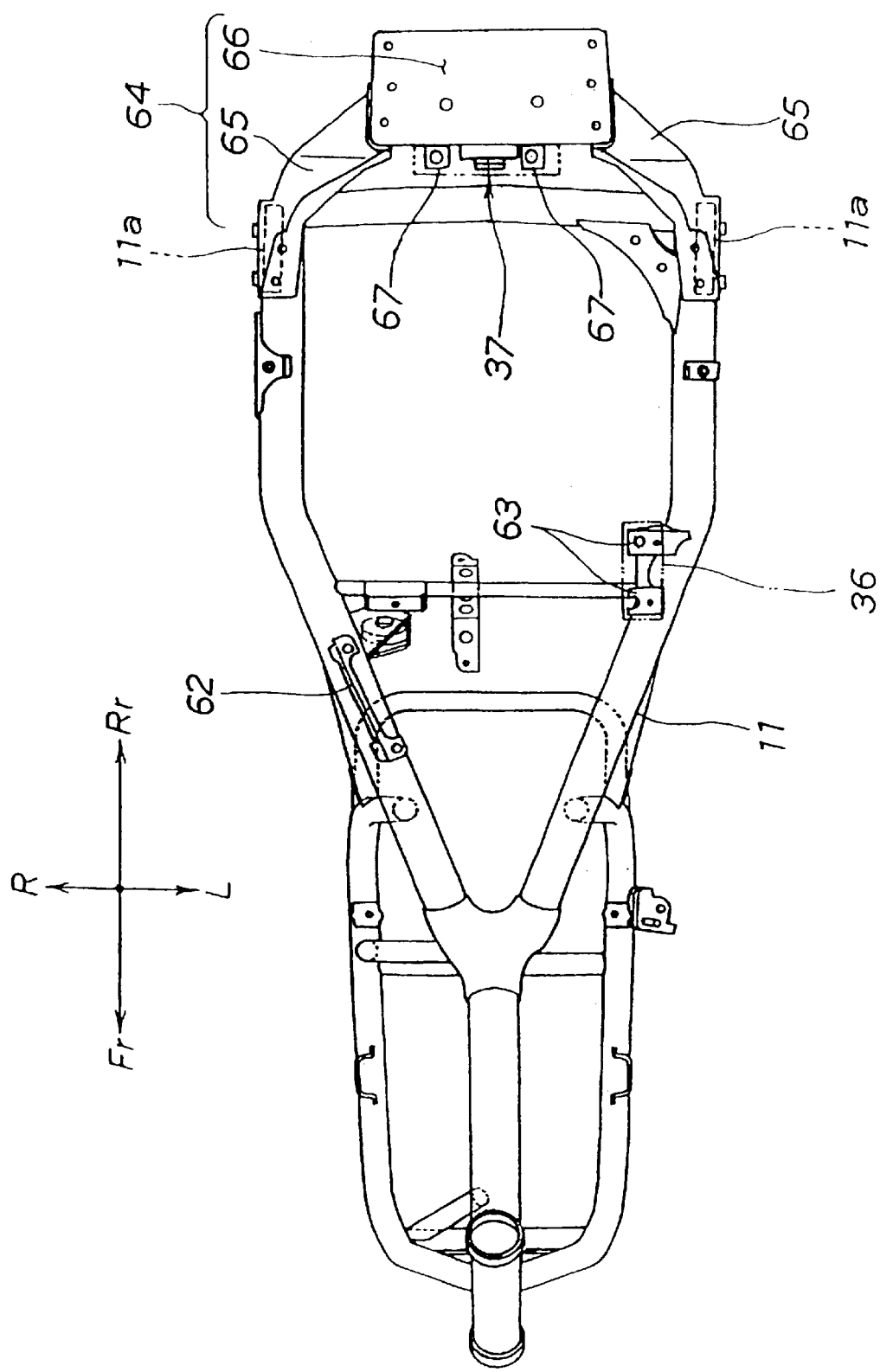
FIG. 4 is a plan view of a vehicle body frame of a motor scooter type vehicle according to the invention.

FIG. 4 is a plan view of a vehicle body frame of the motor scooter type vehicle according to the invention. As shown in FIG. 4, a hinge bracket 62 is illustrated, which is a member for bolting the seat hinge 35, as shown in FIG. 2. Also illustrated in FIG. 4 is a seat catcher bracket 63, which is a member for mounting the first seat locking mechanism 36.

A gate-type stay 64 constructed by fitting left and right leg portions 65, 65 to a rear portion of the vehicle body frame 11 through brackets 11a, 11a, bridgingly mounting a rectangular bridge plate 66 on the leg portions 65, 65, and protruding a pair of left and right pieces 67, 67 from the front edge of the bridge plate 66. The pieces 67, 67 are members for mounting the second seat locking mechanism 37 thereon.

As a result, the opening and closing direction of a locking claw 74 of the first seat locking mechanism 36 coincides with the longitudinal direction of the vehicle body, while the opening and closing direction of a locking claw 95 of the second seat locking mechanism 37 coincides with the width direction of the vehicle.

Figure 5:
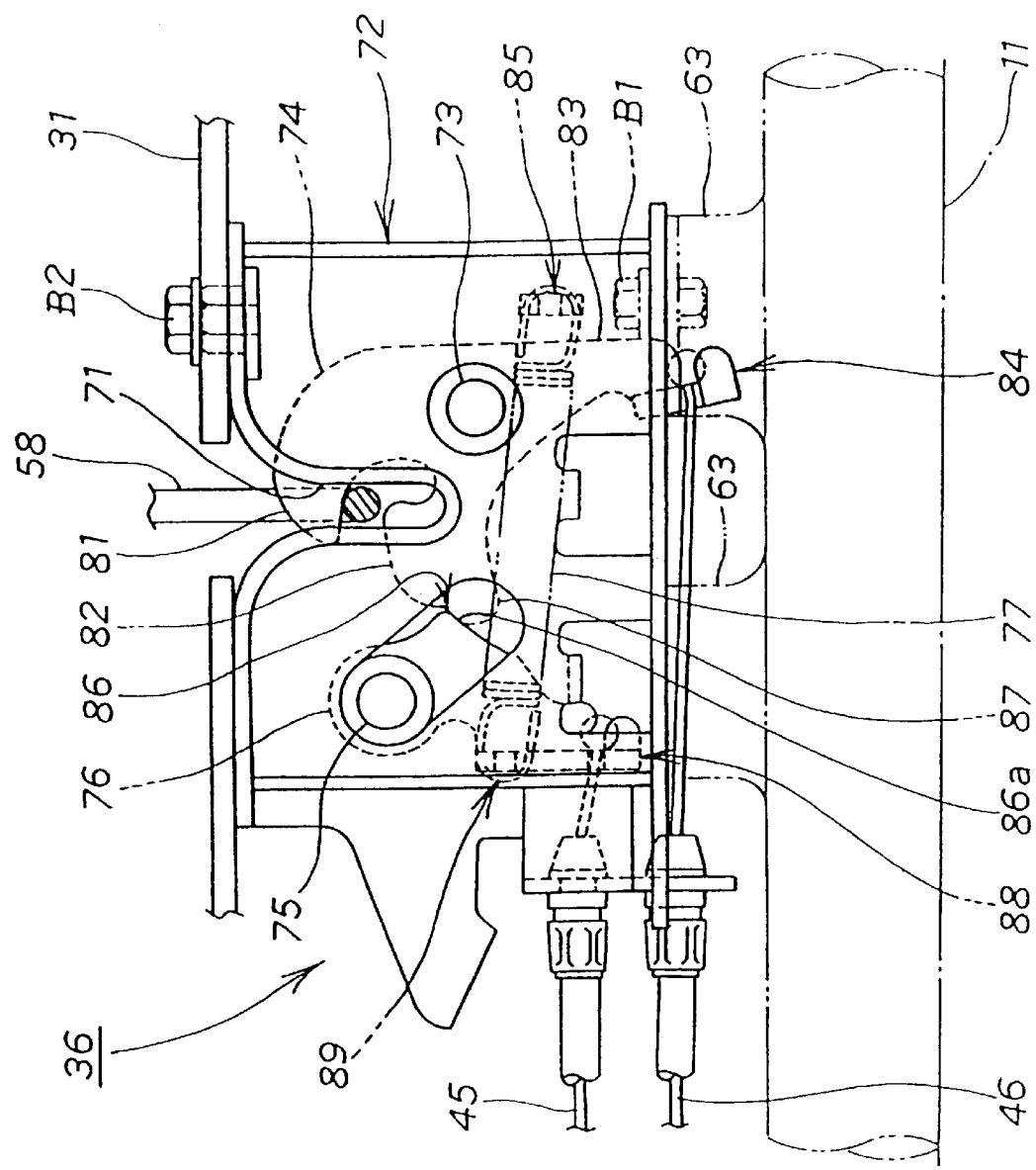
FIG. 5 is a front view of a first seat locking mechanism according to the invention.

FIG. 5 is a front view of the first seat locking mechanism according to the invention. The first seat locking mechanism 36 comprises a housing 72 provided with a U-shaped groove 71, the locking claw 74 as a locking member rotatably fitted to the housing 72 through a pin 73, a relay member 76 rotatably fitted to the housing 72 through a pin 75 for holding the locking claw 74 in a locking position, and a tension coil spring 77 bridgingly disposed between the locking claw 74 and the relay member 76 so as to pull the locking claw 74 to an unlocking side and pull the relay member 76 in a counterclockwise rotational direction.

The locking claw 74 comprises an upper claw 81 and a lower claw 82 in an approximately Y shape, and is provided at a lower arm portion 83 thereof with a second wire fixture portion 84 for attaching one end of a second wire 46 thereto and a spring fixture portion 85 for fitting one end of the tension coil spring 77 thereto.

The relay member 76 comprises a mount portion 86, a slant portion 86a provided at the mount portion 86 for abutting on a lower protruding portion 87 formed on the lower claw 82 of the locking claw 74, a first wire fixture portion 88 for attaching the tip end of the first wire 45, and a spring fixture portion 89 for fitting the other end of the tension coil spring 77.

When the lower claw 82 of the locking claw 74 is pressed down by the first U-shaped claw 58 attached to the seat 15, the locking claw 74 is rotated toward the locking side.

In the structure adopted, the first seat locking mechanism 36 is attached by a bolt B1 to the seat catcher bracket 63 provided on the vehicle body frame 11, and the luggage box 31 is mounted on the first seat locking mechanism 36 and fixed by a bolt B2.

Figure 6:
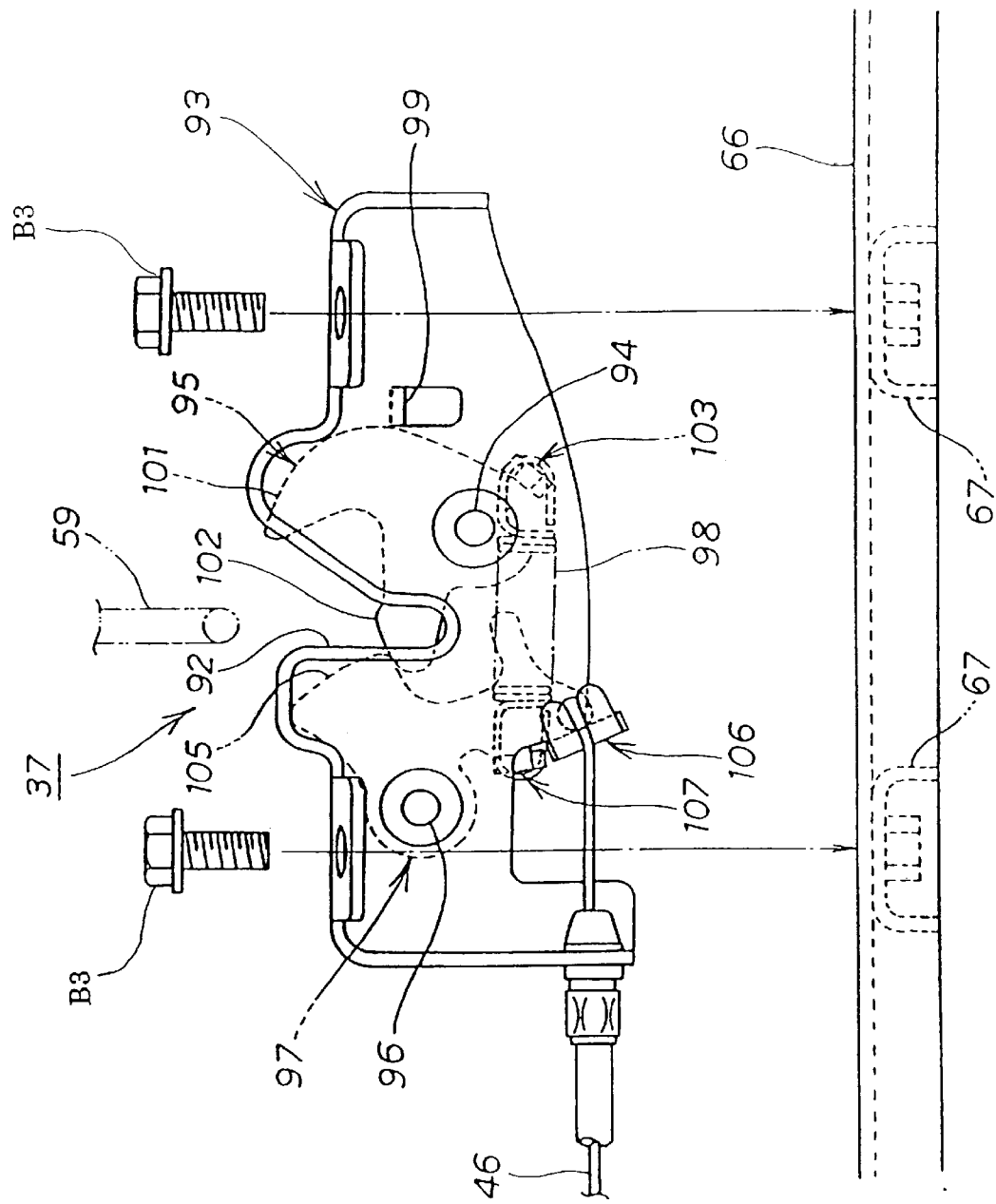
FIG. 6 is a front view of a second seat locking mechanism according to the invention.

FIG. 6 is a front view of the second seat locking mechanism according to the invention. The second seat locking mechanism 37 comprises a housing 93 provided with a U-shaped groove, a locking claw 95 as a locking member rotatably fitted to the housing 93 through a pin 94, a relay member 97 rotatably fitted to the housing 93 through a pin 96 for giving rotation to the locking claw 95, and a tension coil spring 98 bridgingly disposed between the locking claw 95 and the relay member 97 so as to pull the locking claw 95 to an unlocking side and pull the relay member 97 in a clockwise rotational direction. Incidentally, numeral 99 denotes a stopper protruded to the back side of the figure so as to restrain the clockwise rotation of the locking claw 95, and symbols B3, B3 denote fitting bolts for the second seat locking mechanism 37.

The locking claw 95 comprises an upper claw 101 and a lower claw 102 formed in a V shape, and is provided at its lower portion with a spring fixture portion 103 for fitting one end of the tension coil spring 98.

The relay member 97 comprises a jaw portion 105 for abutting on the lower claw 102 of the locking claw 95, a second wire fixture portion 106 for attaching the other end of the second wire 46 thereto, and a spring fixture portion 107 for fitting the other end of the tension coil spring 98.

When a lower portion of the relay member 97 is pulled by the second wire 46, the jaw portion 105 of the relay member 97 presses the lower claw 102 of the locking claw 95 down, whereby the locking claw 95 is rotated toward the locking side (counterclockwise).

The second seat locking mechanism 37 as described above may be provided in plurality. In that case, the relay members 97 of the second seat locking mechanisms 37 are connected to each other by wires, or the relay members 97 of the second seat locking mechanisms 37 are individually connected to the locking claw 74, as shown in FIG. 5 of the first seat locking mechanism 36 by wires.

The operation of the seat fitting structure described above will now be described.

Figure 7B:
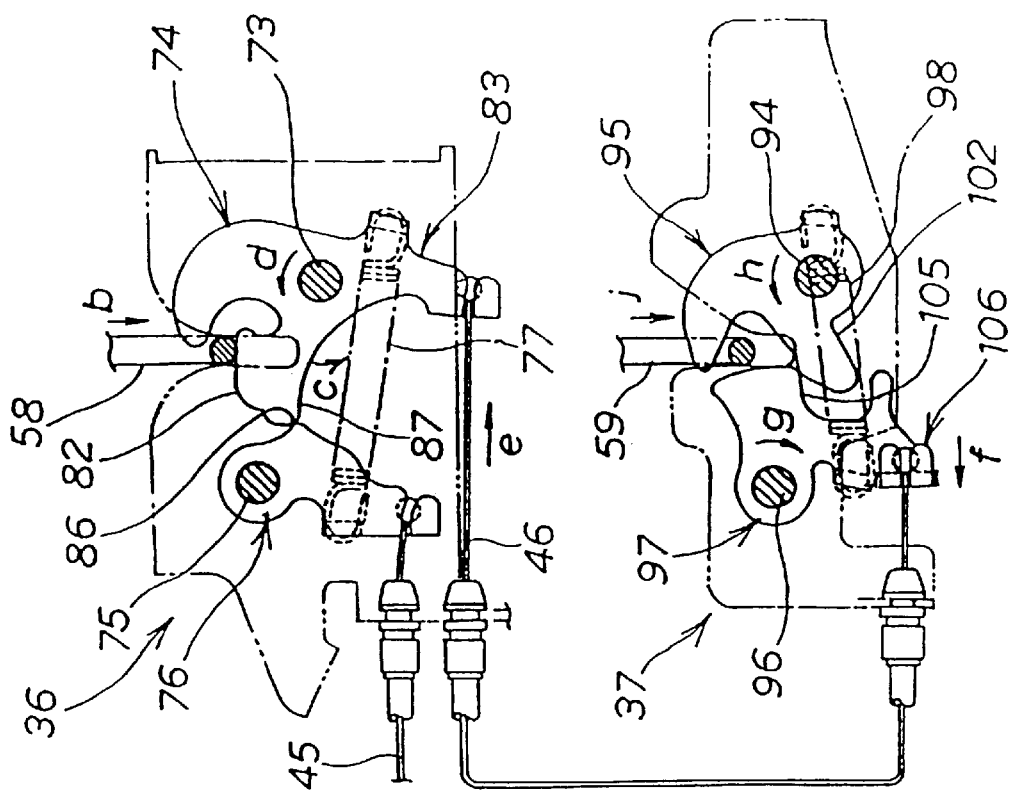
FIGS. 7(a) and 7(b) are first operation diagrams illustrating the operation of the seat fitting structure according to the invention.
Figure 7A:
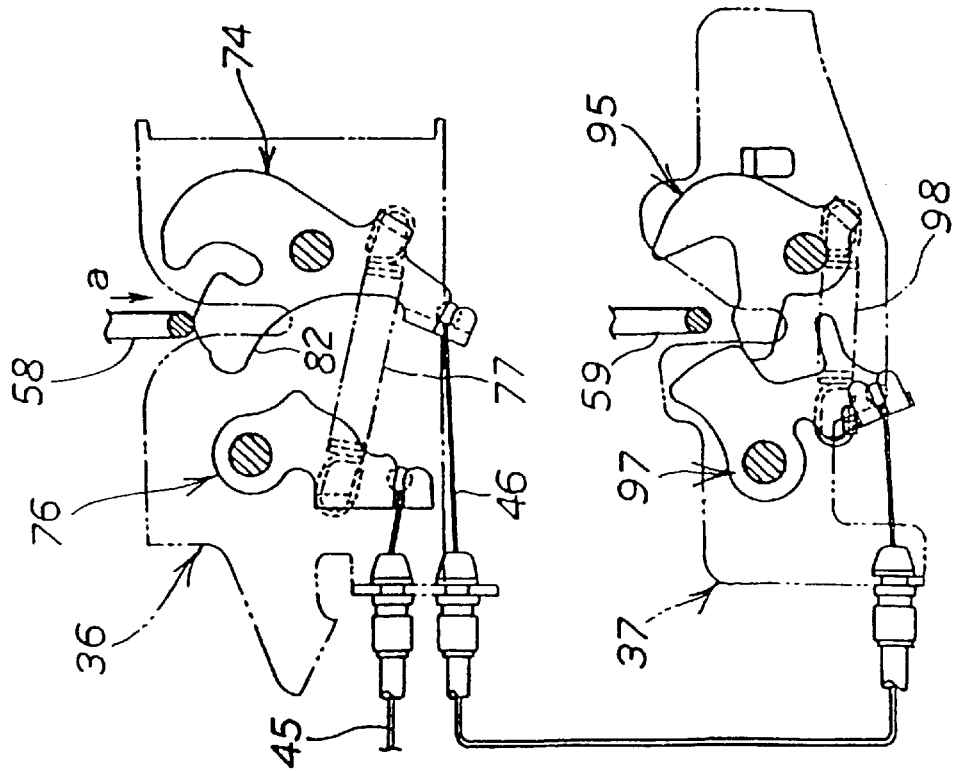

FIGS. 7(a) and 7(b) are a first operation diagram for explaining the operation of the seat fitting structure according to the invention.

In FIG. 7(a), when the seat is pressed down by hand in order to close the seat, the first U-shaped fixture 58 attached to a lower portion of the seat is lowered as an arrow a to abut on the lower claw 82 of the locking claw 74 in the first seat locking mechanism 36. Further, as shown in FIG. 7(b), when the first U-shaped fixture 58 is lowered as an arrow b, the lower claw 82 is lowered as an arrow c to cause the locking claw 74 to rotate as an arrow d with the pin 73 as a center, and the lower protruding portion 87 of the locking claw 74 abuts on the mount portion 86 of the relay member 76. Attendantly, the lower arm portion 83 of the locking claw 74 pulls the second wire 46 as an arrow e.

When the second wire 46 is pulled, the second wire fixture portion 106 of the relay member 97 in the second seat locking mechanism 37 is pulled as an arrow f, and the relay member 97 is rotated as an arrow g. Then, the jaw portion 105 of the relay member 97 presses down the lower claw 102 of the locking claw 95, whereby the locking claw 95 is rotated as an arrow h. At this time, the second U-shaped fixture 59 attached to a lower portion of the seat also is lowered as an arrow j, in substantially the same manner as the first U-shaped fixture 58.

Figure 8B:
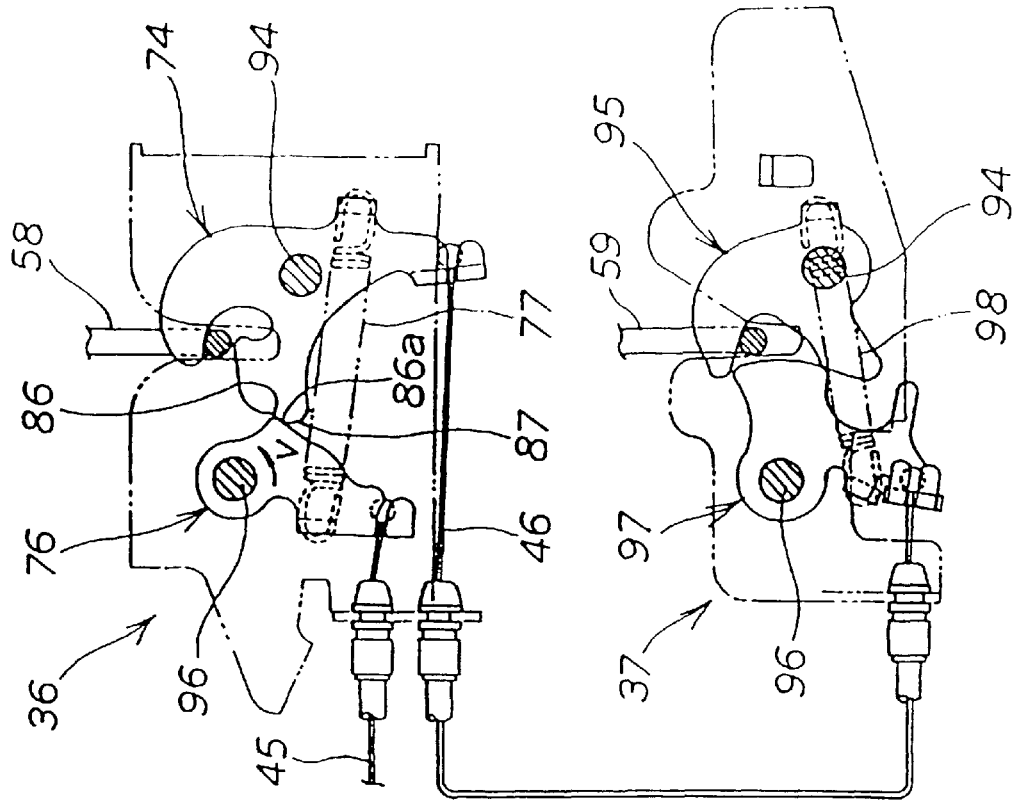
FIGS. 8(a) and 8(b) are second operation diagrams illustrating the operation of the seat fitting structure according to the invention.
Figure 8A:
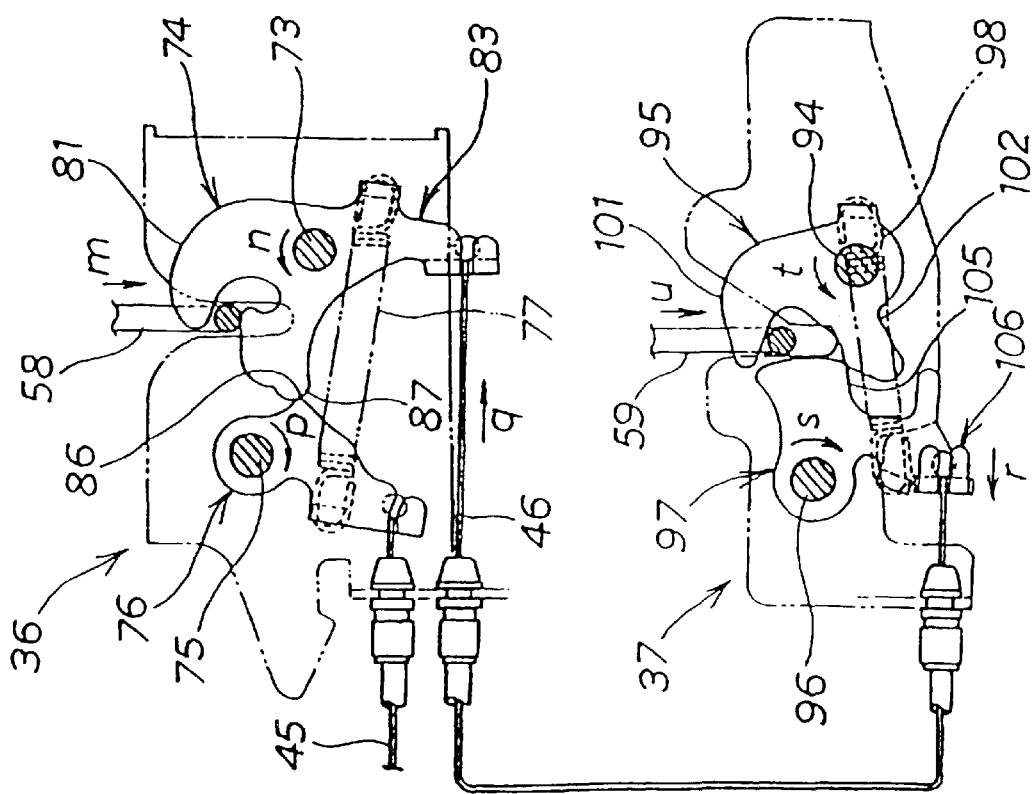

FIGS. 8(a) and 8(b) are a second operation diagram for explaining the operation of the seat fitting structure according to the invention.

In FIG. 8(a), when the first U-shaped fixture 58 is further lowered as an arrow m starting from the condition of the FIG. 7(b), the locking claw 74 is further rotated as an arrow n, and the lower protruding portion 87 of the clocking claw 74 rides over the mount portion 86 of the relay member 76. At this time, the relay member 76 is rotated as an arrow p with the pin 75 as a center. Attendant on the rotation of the clocking claw 74, the lower arm portion 83 pulls the second wire 46 further as an arrow q.

With the second wire 46 pulled, the second wire fixture portion 106 of the relay member 97 is pulled as an arrow r, and the relay member 97 in the second seat locking mechanism 37 is rotated further as an arrow s. Then, the jaw portion 105 of the relay member 97 presses down the lower claw 102 of the locking claw 95 further, whereby the locking claw 95 is rotated further as an arrow t. At this time, the second U-shaped fixture 59 provided at a lower portion of the seat is lowered as an arrow u, in substantially the same manner as the first U-shaped fixture 58.

In FIG. 8(b), after the lower protruding portion 87 of the locking claw 74 has ridden over the mount portion 86, the relay member 76 is rotated as an arrow v by the tensile force of the tension coil spring 77, and the slant portion 86a of the relay member 76 abuts on the lower protruding portion 87.

Thus, the slant portion 86a of the relay member 76 functions as a stopper, whereby clockwise rotation of the locking claw 74 is restricted. Namely, in the first seat locking mechanism 36, a locked condition is established in which the locking claw 74 is engaged with the first U-shaped fixture 58.

At this time, in the second seat locking mechanism 37, the second wire 46 connected with the relay member 97 retains a pulled condition, so that clockwise rotation of the locking claw 95 is restricted through the relay member 97. Namely, a locked condition is established in which the locking claw 95 is engaged with the second U-shaped fixture 59.

In order to bring the first U-shaped fixture 58 and the first seat locking mechanism 36 as well as the second U-shaped fixture 59 and the second seat locking mechanism 37 into unlocked conditions, as shown in FIG. 2, the key 42 is inserted into the keyhole 41 of the key cylinder 25 and is rotated to rotate the lever 43.

By this, in FIG. 8(b), the first wire 45 is pulled, the relay member 76 is rotated in a direction opposite to the direction of the arrow v, and the mount portion 86 of the relay member 76 rides over the lower protruding portion 87 of the locking claw 74, resulting in the condition of FIG. 8(a). The locking claw 74 is rotated in a direction opposite to the direction of the arrow n by the tensile force of the tension coil spring 77, and the upper claw 81 of the locking claw 74 is disengaged from the first U-shaped fixture 58. As a result, the engagement of the first U-shaped fixture 58 and the first seat locking mechanism 36 is in an unlocked condition.

By the rotation of the locking claw 74 in the direction opposite to the arrow n, in FIG. 8(a), the second wire 46 is pulled in the direction opposite to the arrow q. By this, the relay member 97 in the second seat locking mechanism 37 is rotated in the direction opposite to the arrow s. Attendant on an upward movement of the jaw portion 105, the locking claw 95 is rotated in the direction opposite to the arrow t while the lower claw 102 of the locking claw 95 is in abutment on the jaw portion 105, whereby the upper claw 101 of the locking claw 95 is disengaged from the second U-shaped fixture 59. As a result, the engagement of the second U-shaped fixture 59 and the second seat locking mechanism 37 is in an unlocked condition.

As has been described referring to FIG. 5 and FIG. 6, the present invention is characterized in that, in the motor scooter type vehicle 10 comprising the luggage box 31 for storing a helmet or the like, the openable seat 15 closing an opening of the luggage box 31, a plurality of the first and second U-shaped fixtures 58, 59 attached to a lower surface of the seat 15, and the first seat locking mechanism 36 and at least one second seat locking mechanism 37 fitted on the side of the vehicle body frame 11 to be engaged respectively with the first and second U-shaped fixtures 58, 59 so that the seat 15 can be locked by a plurality of lock members, the locking claw 74 of the first seat locking mechanism 36 is connected to the locking claw 95 of the second seat locking mechanism 37 by the second wire 46 through the relay member 97 so that, when the first seat locking mechanism 36 is locked by an external force such as pressing down the seat 15 by hand, the second seat locking mechanism 37 is locked in conjunction with the first seat locking mechanism 36.

By this arrangement, locking operations for a plurality of the first and second seat locking mechanisms can be carried out collectively and easily as compared with the prior art in which the locking operations are carried out individually separately.

In addition, according to the prior art, either one of a plurality of lock members may fail to lock due to dimensional variations or variations in assembly of component parts of the first and second U-shaped fixtures 58, 59, the first seat locking mechanism 36 and the second seat locking mechanism 37. In contrast, according to the invention, at least one second seat locking mechanism 37 can be locked by locking the first seat locking mechanism 36; therefore, locking operations of a plurality of lock members, namely, the first U-shaped fixture 58 and the first seat locking mechanism 36 as well as the second U-shaped fixture 59 and the second seat locking mechanism 37 can be carried out assuredly without being influenced by the dimensional variations, variations in assembly, or difference in height of the first and second U-shaped fixtures 58, 59 arising from the stiffness or largeness of the seat 15.

Accordingly, repeated closing of the seat as in the case where either one of a plurality of lock members fails to lock is obviated, and the convenience to use of the seat 15 can be enhanced.

Besides, in the case of a seat locking mechanism which is unlocked by pulling a wire according to the prior art, an antitheft guard has been provided so as to prevent mischievous action on the wire portion. On the other hand, according to the invention, such antitheft guard is not required because the second seat locking mechanism 37 is locked by pulling the second wire 46. Therefore, the number of component parts can be reduced, and parts cost can be reduced.

Although the invention has been described referring to the case of using a wire as the connecting member, the connecting member is not limited to the wire but may be rod, chain, rope, string or a belt-like member.

In addition, the external force applied to the seat is not limited to a manual force but may be gravity (namely, natural tilting down of the seat) or a force generated by a motor, solenoid, actuator or the like.

The present invention, constituted as described above, displays the following effects.

In the seat fitting structure for motor scooter type vehicle according to the present invention, the locking member of the main lock mechanism is connected to the locking member of the auxiliary lock mechanism by the connecting member such as wire so that, when the main lock mechanism is locked by an external force, the auxiliary lock mechanism is locked in conjunction with the main lock mechanism. Therefore, locking operations of a plurality of the main and auxiliary lock mechanisms can be carried out collectively and easily, instead of individually separately as in the prior art.

In addition, locking operations of a plurality of lock members can be carried out assuredly without being influenced by dimensional variations, variations in assembly of the seat hooks, the main lock mechanism and auxiliary lock mechanism, by stiffness of the seat or the like.

Accordingly, repeated closing of the seat as in the prior-art case where either one of a plurality of lock members fails to lock is obviated, and convenience to use of the seat can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat fining structure for a vehicle comprising:
   a storage portion;
   an openable seat for closing an opening of said storage portion; a plurality of seat hooks attached to a lower surface of said openable seat;
   a first lock mechanism including a first locking member and a first relay member provided on the vehicle;
   at least one second lock mechanism including a second locking member and a second relay member provided on the vehicle, said first lock mechanism and said at least one second lock mechanism engageable with said seat hooks so that said openable seat can be locked,
      wherein said first locking member of said first lock mechanism is connected to said second relay member of said at least one second lock mechanism through a connecting member, so that when said first lock mechanism is locked by an external force, said at least one second lock mechanism is locked in conjunction with said first lock mechanism.

2. The seat fitting structure according to claim 1, wherein said connecting member is a wire.

3. The seat fitting structure according to claim 2, wherein said connecting member is selected from a group consisting of a rod, chain, rope, string, or a belt member.

4. The seat fitting structure according to claim 2, wherein said connecting member further comprises:
   a first wire; and
   a second wire.

5. The seat fitting structure according to claim 1, wherein said locking members of said first and second lock mechanism each comprise:
   an upper claw; and
   a lower claw.

6. The seat fitting structure according to claim 1, wherein said first locking member further comprises a first connecting member fixture portion, and said second relay member further comprises a second connecting member fixture portion.

7. The seat fitting structure according to claim 6, wherein said first connecting member fixture portion is connected to said second connecting member fixture portion by said connecting member so that when said first connecting member fixture portion exerts a force, said second connecting member fixture portion exerts a complimentary force.

8. The seat fitting structure according to claim 1, wherein said first and second relay members retain a pulled condition, so that rotation of said first and second locking members are restricted through said first and second relay members.

9. The seat fitting structure according to claim 1, wherein said first lock mechanism further comprises:
   a housing for providing a U-shaped groove;
   a pin member for rotatably mounting said first relay member onto said housing, said first relay member holding said first locking member in a locking position; and a tension coil spring disposed between said first locking member and said first relay member so as to pull said first locking member to an unlocking position and pull said first relay member in a counterclockwise rotational direction.

10. The seat fitting structure according to claim 9, wherein said second lock mechanism further comprises:

a housing for providing a U-shaped groove;

a second pin member for rotatably mounting said second relay member onto said housing, said second relay member for giving rotation to said second locking member; and a second tension coil spring disposed between said second locking member and said second relay member so as to pull said second locking member to an unlocking position and pull said second relay member in a clockwise rotational direction.

11. The seat fitting structure according to claim 1, wherein the connecting member further comprises a first wire, said first wire disengages and first lock mechanism in order to provide an unlocked condition.

12. The seat fitting structure according to claim 1, wherein said plurality of seat hooks further comprises a U-shaped fixture.

13. The seat fitting structure according to claim 1, wherein said plurality of seat hooks further comprises:

a first U-shaped fixture; and a second U-shaped fixture, whereby said first and second U-shaped fixture are perpendicular to each other.

* * * * *